United States Patent
Saito

(10) Patent No.: US 12,093,612 B2
(45) Date of Patent: Sep. 17, 2024

(54) ANALYSIS METHOD AND APPARATUS FOR OPTIMIZING VIBRATION PERFORMANCE OF AUTOMOTIVE BODY

(71) Applicant: JFE STEEL CORPORATION, Tokyo (JP)

(72) Inventor: Takanobu Saito, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 890 days.

(21) Appl. No.: 17/260,701

(22) PCT Filed: Jun. 6, 2019

(86) PCT No.: PCT/JP2019/022552
§ 371 (c)(1),
(2) Date: Jan. 15, 2021

(87) PCT Pub. No.: WO2020/054153
PCT Pub. Date: Mar. 19, 2020

(65) Prior Publication Data
US 2021/0279383 A1 Sep. 9, 2021

(30) Foreign Application Priority Data
Sep. 14, 2018 (JP) ................. 2018-172104

(51) Int. Cl.
*G06F 30/20* (2020.01)
*G06F 30/15* (2020.01)
*G06F 30/17* (2020.01)

(52) U.S. Cl.
CPC ............ *G06F 30/20* (2020.01); *G06F 30/15* (2020.01); *G06F 30/17* (2020.01)

(58) Field of Classification Search
CPC ........ G06F 18/232; G06N 3/08; G06N 20/00
See application file for complete search history.

(56) References Cited

U.S. PATENT DOCUMENTS

2006/0259283 A1* 11/2006 Brughmans ............ G06F 30/15
703/2
2007/0208443 A1 9/2007 Caprioli
(Continued)

FOREIGN PATENT DOCUMENTS

CN 1867919 A 11/2006
CN 106202693 A 12/2016
(Continued)

OTHER PUBLICATIONS

Rajan et al., "Inertia relief analysis of automotive control arm," International Research Journal of Engineering and Technology (IRJET) vol. 03 Issue: 06 (Year: 2016).*
(Continued)

*Primary Examiner* — Steven W Crabb
(74) *Attorney, Agent, or Firm* — Oliff PLC

(57) ABSTRACT

An analysis method of optimizing vibration performance of a part of an automotive body, including: acquiring a maximum displacement of vibration of the part of the automotive body; acquiring a load required for applying a same displacement as the acquired maximum displacement, to the part of the automotive body; setting a design space by setting a part or member that supports the part of the automotive body as an optimization target; generating an optimization block model formed of three-dimensional elements in the set design space; generating an optimization analysis model by combining the generated optimization block model to the automotive body; and acquiring an optimal shape of the optimization block model by: applying the acquired load as a load condition; and performing optimization analysis for the optimization block model taking an inertial force that occurs in the part of the automotive body due to vibration into consideration.

8 Claims, 13 Drawing Sheets

(a) OPTIMAL SHAPE   (b) OPTIMIZATION SHAPE PART

(56) References Cited

U.S. PATENT DOCUMENTS

2010/0262406 A1* 10/2010 Goel .................. G06F 30/15
703/2
2020/0039592 A1 2/2020 Saito

FOREIGN PATENT DOCUMENTS

| CN | 107403040 A | 11/2017 |
|----|----|----|
| JP | 2010-250818 A | 11/2010 |
| JP | 2013-025533 A | 2/2013 |
| JP | 2016-170476 A | 9/2016 |
| JP | 2017-068320 A | 4/2017 |
| JP | 2017-078943 A | 4/2017 |
| JP | 2018-005677 A | 1/2018 |
| JP | 2018-139029 A | 9/2018 |
| WO | 2018/066283 A1 | 4/2018 |

OTHER PUBLICATIONS

Park; "Technical overview of the equivalent static loads method for non-linear static response structural optimization;" Structural and Multidisciplinary Optimization; 2011; pp. 319-337; vol. 43, No. 3.

Kang et al.; "Structural optimization under equivalent static loads transformed from dynamic loads based on displacement:" Computers & Structures; 2001; pp. 145-154; vol. 79.

Choi et al.; "Structural optimization using equivalent static loads at all time intervals;" Computer Methods in Applied Mechanics and Engineering; 2002; pp. 2077-2094; vol. 191.

Sep. 7, 2021 Extended Search Report issued in European Patent Application No. 19860328.4.

Oct. 16, 2023 Office Action issued in Chinese Patent Application No. 201980058791.4.

Li Zhao-kai et al., "Component sensitivity analysis and lightweight design for static and dynamic stiffness of body-in-white structure", Journal of Chang'an University (Natural Science Edition), vol. 36, No. 6, (2016), pp. 111-117.

Takezawa et al.; "Structural Optimization Based on the Phase Field Method and Sensitivity Analysis;" Transactions of the JSME (part A); 2010-2011; pp. 1-9; vol. 76, No. 761.

Sep. 10, 2019 Search Report issued in International Patent Application No. PCT/JP2019/022552.

* cited by examiner (a) EXCITATION CONDITION  (b) LOAD CONDITION (a) ORIGINAL SHAPE (b) DESIGN SPACE AND OPTIMIZATION BLOCK MODEL (a) OPTIMAL SHAPE      (b) OPTIMIZATION SHAPE PART (a) ORIGINAL SHAPE         (b) DESIGN SPACE AND
                              OPTIMIZATION BLOCK MODEL (a) OPTIMAL SHAPE          (b) OPTIMIZATION SHAPE PART

ANALYSIS METHOD AND APPARATUS FOR OPTIMIZING VIBRATION PERFORMANCE OF AUTOMOTIVE BODY

FIELD

The present invention relates to an analysis method and apparatus for optimizing vibration performance of an automotive body of an automobile, which optimize vibration performance of a part of the automotive body to acquire an optimal shape that achieves weight reduction of the automotive body while at the same time improving dynamic stiffness of the part of the automotive body. Shape optimization in the present invention does not refer to assuming a predetermined shape such as a T shape and acquiring an optimal shape based on the predetermined shape, but refers to acquiring an optimal shape and arrangement that satisfy an analysis condition without assuming a predetermined shape.

BACKGROUND

Indicators for stiffness of a structure include static stiffness and dynamic stiffness. The static stiffness of a structure is improved when a spring constant of the structure increases independently of a mass of the structure in accordance with Hooke's law. In contrast, the dynamic stiffness of a structure is known to be influenced by its vibration performance when the shape of the structure changes periodically due to input of a load at an excitation point. For example, the dynamic stiffness in the case of vibration in one degree of freedom as illustrated in FIG. 20 is evaluated by a frequency of $\Omega=(K/M)^{0.5}$ using stiffness K (corresponding to stiffness matrix in the case of vibration in multi-degree of freedom system) and a mass M, and the dynamic stiffness is known to be improved when the frequency $\Omega$ increases due to improvement of the stiffness K.

However, in a case where the mass M of a structure increases, the frequency $\Omega$ may not increase even when the stiffness K increases. In such a case, the dynamic stiffness is not improved. Thus, it is effective to reduce the weight of the structure and improve the stiffness in order to improve the dynamic stiffness. However, in general, as the mass M increases, the stiffness K also increases, which means that increase of the stiffness and weight reduction (reduction of mass M) contradict each other, resulting in extreme difficulty in achieving both thereof. As a result, many attempts have been made through trial and error to optimize the vibration performance of a structure and improve the dynamic stiffness.

In recent years, the weight of an automotive body has been reduced due to an environmental problem particularly in automobile industry, and analysis (hereinafter referred to as "CAE analysis") by computer aided engineering is an essential technology for design of an automotive body. In this CAE analysis, the stiffness is known to be improved and the weight reduction is known to be achieved by using optimization technologies such as mathematical optimization, thickness optimization, shape optimization, and topology optimization, and for example, such optimization technologies are often used for structure optimization of a cast metal, for example, an engine block.

In particular, topology optimization is gradually attracting attention among the optimization technologies. Topology optimization is a method of providing a design space with a certain degree of size, incorporating a three-dimensional element into the design space, and securing a minimum necessary part of the three-dimensional element that satisfies a given condition, to thereby acquire an optimal shape that satisfies the given condition. Thus, as the topology optimization, a method of directly applying a constraint to three-dimensional elements forming the design space and directly applying a load is used. Patent Literature 1 discloses a method for topology optimization of components of a complex structure as the technology relating to such topology optimization.

CITATION LIST

Patent Literature

Patent Literature 1: Japanese Patent Application Laid-open No. 2010-250818

SUMMARY

Technical Problem

A driver or vehicle occupant feels a vibration phenomenon in a part (e.g., automotive-body parts) of an automotive body of an automobile until the frequency reaches about 30 Hz, which causes the driver or vehicle occupant to feel uncomfortable and also have trouble driving safely. To address this issue, it is necessary to improve the dynamic stiffness of the part of the automotive body in order to achieve the frequency of 30 Hz or more. Meanwhile, as described above, the frequency of an automotive body that is vibrating due to reception of an external force at an excitation point is represented by the static stiffness and mass of the automotive body, and for example, even when the thickness of the automotive body is increased to improve the static stiffness of the automotive body, the mass of the automotive-body parts increases, which prevents transition to a high-frequency region and results in a failure to improve the dynamic stiffness of the automotive-body parts. Furthermore, some automotive-body parts are desired to have such vibration performance as to prevent resonance with vibration of a part (e.g., engine) that exhibits vibration in an automobile.

Hitherto, a technology of using optimization analysis to design an automotive body with a structure that has high static stiffness and least possible weight has been used. However, the automotive body changes periodically in a dynamic vibration phenomenon of a part of the automotive body. As a result, there has been a demand for an analysis technology capable of optimizing vibration performance of the part of the automotive body in consideration of the dynamic vibration phenomenon.

The technology disclosed in Patent Literature 1 relates to a physical system of a technique and analysis in terms of mathematical operation, and does not provide any solution to the above-mentioned problem. Thus, there is a demand for development of a technology for solving the above-mentioned problem.

The present invention has been made in view of the above-mentioned problem, and has an object to provide an analysis method and apparatus for optimizing vibration performance of a part of an automotive body, and achieving both of improvement of dynamic stiffness of the part of the automotive body and weight reduction of the part of the automotive body.

Solution to Problem

To solve the problem and achieve the object, an analysis method according to the present invention is a method of optimizing vibration performance of an automotive body, the analysis method in which a computer performs each steps given below to optimize vibration performance of a part of the automotive body, the analysis method including: a vibration analysis step of acquiring a maximum displacement of vibration of the part of the automotive body by: applying a predetermined excitation condition to the part of the automotive body; and performing vibration analysis; a maximum displacement load acquisition step of acquiring a load required for applying a same displacement as the acquired maximum displacement, to the part of the automotive body; a design space setting step of setting a design space by setting a part or member that supports the part of the automotive body as an optimization target; an optimization block model generation step of generating an optimization block model formed of three-dimensional elements in the set design space; a combining processing step of generating an optimization analysis model by combining the generated optimization block model to the automotive body; and an optimization analysis step of acquiring an optimal shape of the optimization block model by: applying the load acquired in the maximum displacement load acquisition step as a load condition; and performing optimization analysis for the optimization block model taking an inertial force that occurs in the part of the automotive body due to vibration into consideration.

Moreover, in the analysis method of optimizing vibration performance of an automotive body according to the present invention, the optimization block model generation step sets a specific gravity of the optimization block model such that a mass of the optimization block model is equal to a mass of the part or member being the optimization target.

Moreover, the analysis method of optimizing vibration performance of an automotive body according to the present invention further includes a sensitivity analysis step of identifying the part or member being the optimization target by applying the load acquired in the maximum displacement load acquisition step as a load condition, and performing sensitivity analysis of the automotive body, wherein the design space setting step sets the design space for the part or member identified in the sensitivity analysis step.

Moreover, an analysis apparatus according to the present invention configured to optimize vibration performance of an automotive body, the analysis apparatus being configured to optimize vibration performance of a part of the automotive body, and includes: a vibration analysis unit configured to acquire a maximum displacement of the part of the automotive body by: applying a predetermined excitation condition to the part of the automotive body; and performing vibration analysis; a maximum displacement and load acquisition unit configured to acquire a load required for applying a same displacement as the acquired maximum displacement, to the part of the automotive body; a design space setting unit configured to set a design space by setting a part or member that supports the part of the automotive body as an optimization target; an optimization block model generation unit configured to generate an optimization block model formed of three-dimensional elements in the set design space; a combining processing unit configured generate an optimization analysis model by combining the generated optimization block model to the automotive body; and an optimization analysis unit configured to acquire an optimal shape of the optimization block model by: applying the load acquired by the maximum displacement load acquisition unit as a load condition; and performing optimization analysis for the optimization block model taking an inertial force that occurs in the part of the automotive body due to vibration into consideration.

Moreover, in the analysis apparatus configured to optimize vibration performance of the automotive body according to the present invention, the optimization block model generation unit is configured to set a specific gravity of the optimization block model such that a mass of the optimization block model is equal to a mass of the part or member being the optimization target.

Moreover, the analysis apparatus configured to optimize vibration performance of an automotive body according to the present invention further includes a sensitivity analysis unit configured to identify the part or member being the optimization target by: applying the load acquired by the maximum displacement load acquisition unit as a load condition; and performing sensitivity analysis of the automotive body, wherein the design space setting unit is configured to set the design space for the part or member identified by the sensitivity analysis unit.

Advantageous Effects of Invention

According to the present invention, there is provided a method, which is executed by a computer through execution of each step given below to optimize vibration performance of a part of the automotive body, the method including: a vibration analysis step of performing vibration analysis by applying a predetermined excitation condition to the part of the automotive body, and acquiring a maximum displacement of vibration of the part of the automotive body; a maximum displacement load acquisition step of acquiring a load required for applying, to the part of the automotive body, the same displacement as the acquired maximum displacement; a design space setting step of setting a design space by setting a part or member that supports the part of the automotive body as an optimization target; an optimization block model generation step of generating an optimization block model formed of three-dimensional elements in the set design space; a combining processing step of combining the generated optimization block model to the automotive body, and generating an optimization analysis model; and an optimization analysis step of performing optimization analysis for the optimization block model in consideration of an inertial force that occurs in the part of the automotive body due to vibration by applying the load acquired in the maximum displacement load acquisition step as a load condition, and acquiring an optimal shape of the optimization block model, to thereby be able to acquire an optimal shape of a part or member that supports the part of the automotive body, optimize the vibration performance of the part of the automotive body, and achieve both of improvement of dynamic stiffness of the part of the automotive body and weight reduction of the part of the automotive body.

DESCRIPTION OF EMBODIMENTS

Now, prior to description of an analysis method and apparatus for optimizing vibration performance of an automotive body according to an embodiment of the present invention, the relevant automotive body in the present embodiment is described.

Automotive Body

Figure 2:
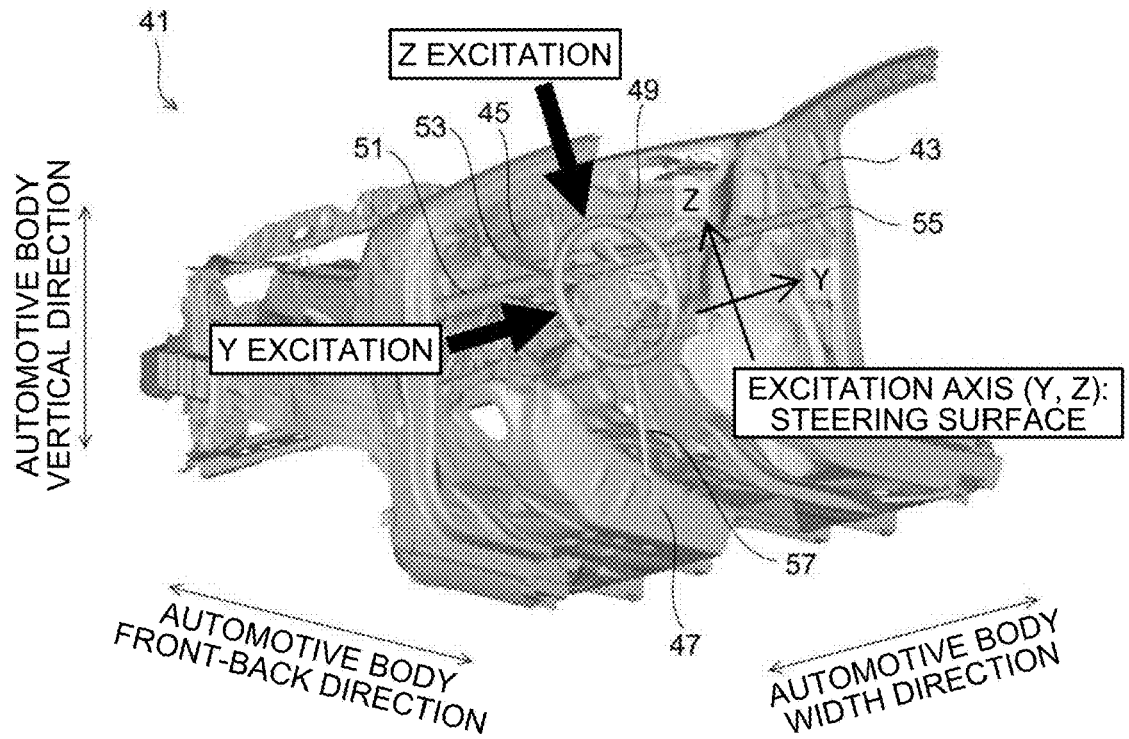
FIG. 2 is a diagram illustrating a steering wheel and a part or member supporting the steering wheel, which are a part of the automotive body for which vibration performance is to be optimized in an embodiment of the present invention.

As illustrated in FIG. 2, an automotive body 41 in the present embodiment includes an automotive body frame part such as A pillars 43, a dashboard 45, and a tunnel portion 47 of an automotive body floor, a steering wheel 49 being a part of the automotive body 41 for which vibration performance is to be optimized, a steering beam 51 being a part or member supporting the steering wheel 49, a bracket 53, connection sections 55, and a stay section 57.

The steering wheel 49 is a part that is excited to vibrate, and in the present embodiment, as illustrated in FIG. 2, the steering wheel 49 vibrates in a width direction (Y-axis direction in FIG. 2) and a vertical direction (Z-axis direction in FIG. 2) on a steering surface of the steering wheel 49 (surface orthogonal to rotation axis of steering wheel 49).

The part or member supporting the steering wheel 49 supports the steering wheel 49 directly or indirectly, and is installed on a path that transmits vibration when the steering wheel 49 is excited.

Figure 3:
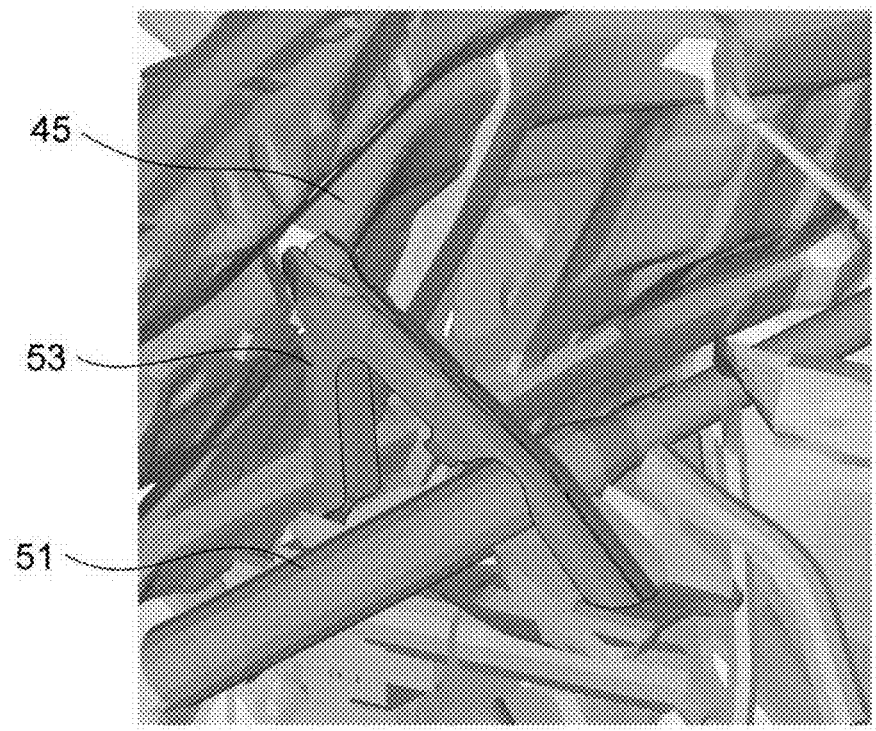
FIG. 3 is a diagram illustrating an original shape of a bracket supporting the steering wheel in an embodiment of the present invention.

Both ends of the steering beam 51 are fixed to the A pillars 43 of the automotive body 41. One end of the bracket 53 is fixed to the dashboard 45 of the automotive body, and the other end of the bracket 53 is connected to the steering beam 51 (refer to FIG. 3). The connection sections 55 are used to connect fix both ends of the steering beam 51 to the A pillars 43. A lower end of the stay section 57 is connected and fixed to the tunnel portion 47 of the automotive body floor, and an upper end of the stay section 57 is connected to the steering beam 51.

Each part or member described above is modeled by using two-dimensional elements and/or three-dimensional elements, the modeled element information and other information may be stored in an automotive body model file 31 (refer to FIG. 1) described later.

Analysis Apparatus for Optimizing Vibration Performance of Automotive Body

In the following, description is given of a configuration of an analysis apparatus for optimizing vibration performance (hereinafter referred to as "vibration performance optimization analysis apparatus") of an automotive body according to the present embodiment.

Figure 1:
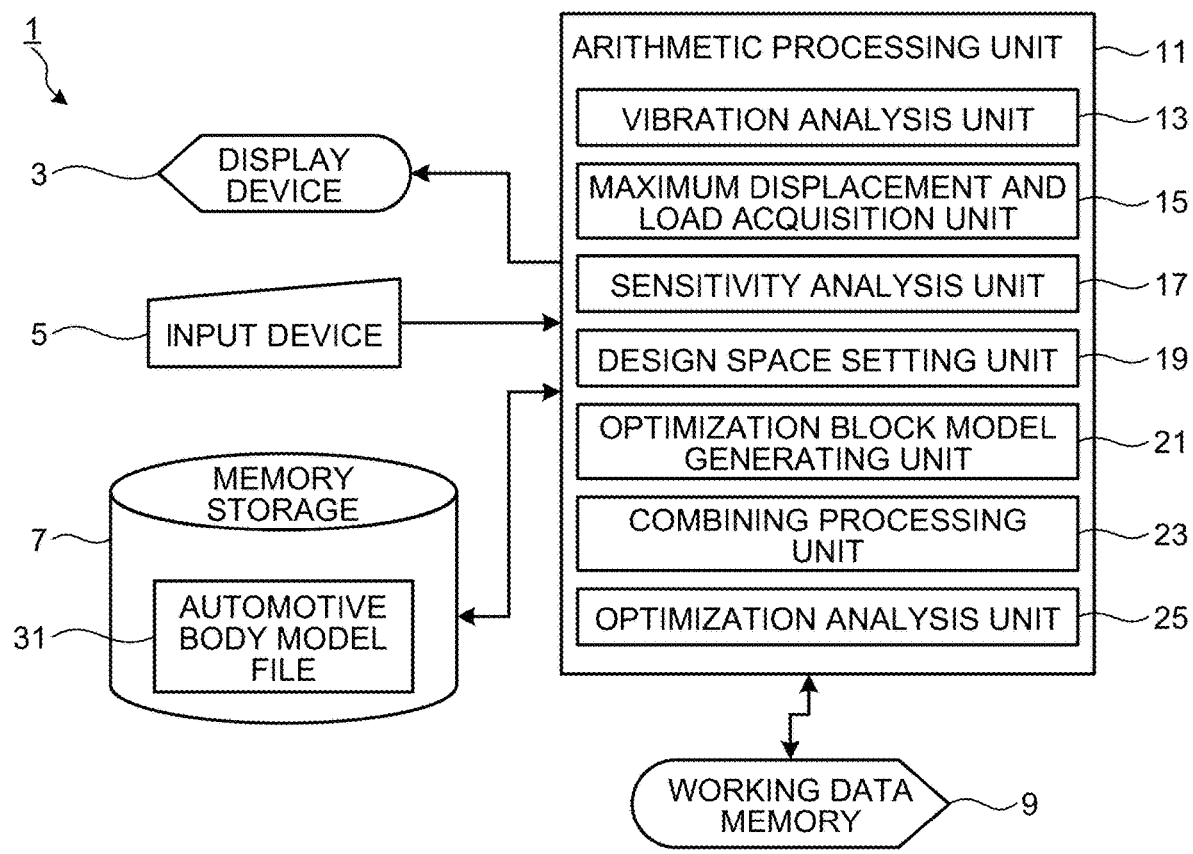
FIG. 1 is a block diagram illustrating an analysis apparatus for optimizing vibration performance of an automotive body according to an embodiment of the present invention.

As illustrated in FIG. 1, a vibration performance optimization analysis apparatus 1 according to the present embodiment is constructed by, for example, a personal computer, and includes a display device 3, an input device 5, a memory storage 7, a working data memory 9, and an arithmetic processing unit 11. Furthermore, the display device 3, the input device 5, the memory storage 7, and the working data memory 9 are connected to the arithmetic processing unit 11, and each function is executed in accordance with a command from the arithmetic processing unit 11.

In the following, description is given of each configuration of the vibration performance optimization analysis apparatus 1 according to the present embodiment in a case where the shapes of the steering wheel 49 for which vibration performance is to be optimized and the bracket 53 being a part on the path that transmits vibration of the steering wheel 49, which are parts of the automotive body, are optimized for the automotive body 41 illustrated in FIG. 2.

Display Device

The display device 3 is used for displaying an analysis result, for example, and is constructed by a liquid crystal monitor, for example.

Input Device

The input device 5 is used for giving an instruction to display the automotive body model file 31 or inputting a condition by an operator, for example, and is constructed by a keyboard or a mouse, for example.

Memory Storage

The memory storage 7 is used for storing various kinds of files such as the automotive body model file 31, for example, and is constructed by a hard disk, for example.

Working Data Memory

The working data memory 9 is used for temporarily storing or calculating data to be used by the arithmetic processing unit 11, and is constructed by a random access memory (RAM), for example.

Arithmetic Processing Unit

As illustrated in FIG. 1, the arithmetic processing unit 11 includes a vibration analysis unit 13, a maximum displacement and load acquisition unit 15, a sensitivity analysis unit 17, a design space setting unit 19, an optimization block model generating unit 21, a combining processing unit 23, and an optimization analysis unit 25, and is constructed by a central processing unit (CPU), for example, a personal computer. Functions of those units are implemented through execution of a predetermined computer program by the CPU. In the following, description is given of the function of each unit of the arithmetic processing unit 11 described above.

Vibration Analysis Unit

The vibration analysis unit 13 performs vibration analysis by applying a predetermined excitation condition to the steering wheel 49 in the automotive body 41, and acquires a maximum displacement of the steering wheel 49. In the present embodiment, the vibration analysis unit 13 uses frequency response analysis being one technique of vibration analysis. The frequency response analysis is to acquire response in a case where a sine-wave load constantly acts on a structure.

In frequency response analysis in the present embodiment, a plurality of sine-wave frequencies and load amplitudes in respective sine-wave frequencies are given as an excitation condition to be applied to the steering wheel 49. In the present embodiment, as illustrated in FIG. 2, such an excitation condition (Y excitation and Z excitation) as to cause the steering wheel 49 to vibrate in each of the Y direction and the Z direction is given.

Figure 4:
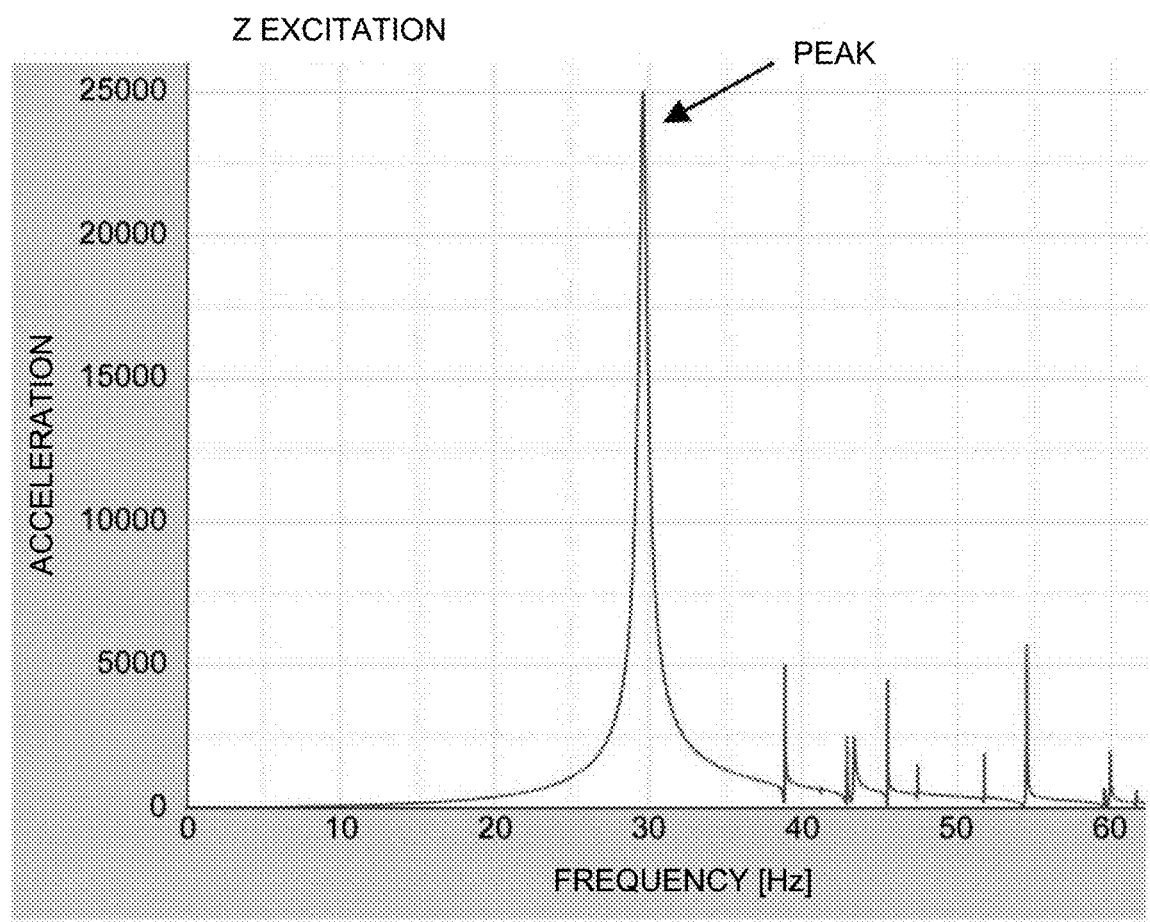
FIG. 4 is a graph showing an example of a result of frequency response acquired by frequency response analysis of the steering wheel.

FIG. 4 represents an example of a result of the frequency response analysis. In FIG. 4, the horizontal axis represents the frequency of vibration, and the vertical axis represents the acceleration amplitude of each frequency. In this manner, it is possible to acquire time response of the displacement of the steering wheel 49 by adding up sine-wave displacements of respective frequencies based on the result of frequency response analysis, and acquire the maximum displacement in the acquired time response.

Maximum Displacement and Load Acquisition Unit

The maximum displacement and load acquisition unit 15 acquires a load required for applying, to the steering wheel 49, the same displacement as the maximum displacement of the steering wheel 49 acquired by the vibration analysis unit 13.

Figure 5:
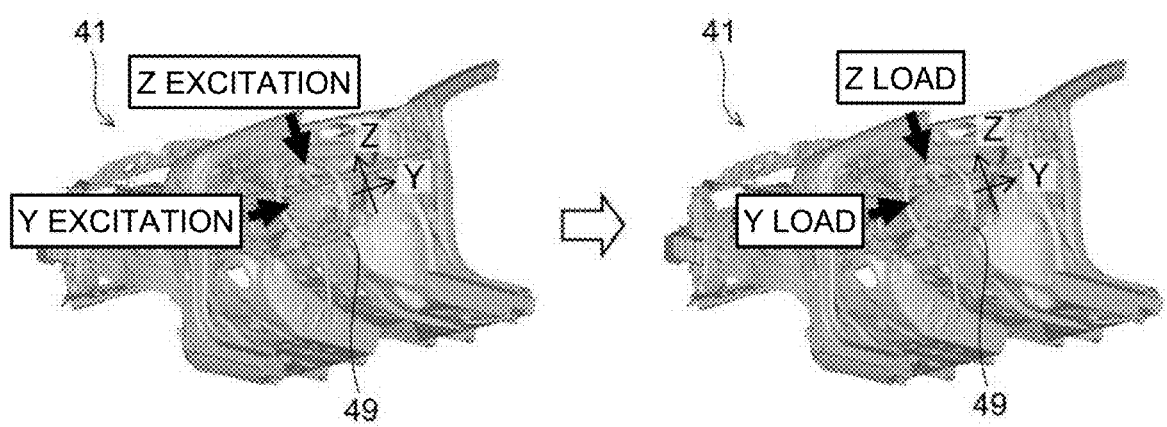
FIGS. 5(a) and 5(b) are diagrams illustrating an excitation condition in vibration analysis and a load condition acquired based on an analysis result of the vibration analysis in the present embodiment.

In the present embodiment, frequency response analysis is performed for each of Y excitation and Z excitation, and the maximum displacement is acquired for each of the Y direction and the Z direction. Then, as illustrated in FIGS. 5, loads (Y load and Z load) are acquired for Y excitation and Z excitation, respectively.

The maximum displacement and load acquisition unit 15 may perform static analysis that considers a mass through use of an inertia relief method by changing a load to be applied to the steering wheel 49, for example, and acquire through trial and error a load that causes the same displacement as the maximum displacement acquired by the vibration analysis unit 13.

The maximum displacement and load acquisition unit 15 may appropriately correct the rotational degree of freedom of the steering wheel 49 at a time when the load is applied in the excitation direction so as to cause the maximum displacement of the steering wheel 49 acquired by frequency response analysis to match the displacement of the steering wheel 49 at the time when the load is applied.

As illustrated in FIG. 5(b), the Y load and Z load to be applied to the steering wheel 49 as the load are both set to have one direction (Y load: rightward in automotive body width direction; Z load: downward in automotive body height direction). This is because there is no difference in absolute value of strain energy and stress acquired by optimization analysis described later even when the direction of applying the load is reversed, which also leads to no difference in result of optimization analysis.

Sensitivity Analysis Unit

The sensitivity analysis unit 17 performs sensitivity analysis (e.g., refer to publicly known reference literature given below) of the automotive body 41 by applying the load acquired by the maximum displacement and load acquisition unit 15 as a load condition, and identifies a part or member being an optimization target.

(Reference Literature) Takezawa, et al, Transactions of the JSME (part A), volume 76, number 761 (2010-1), pp. 1-9.

The sensitivity analysis is to estimate an influence on the structural response of a structure (e.g., automotive body 41) to be analyzed by changing parameters such as a material property, geometric characteristics, and a boundary condition. In the present embodiment, it is assumed that the sensitivity analysis unit 17 acquires the sensitivity of an objective function in optimization analysis as the influence on the structural response by setting, as parameters relating to the material property, design variables in optimization analysis by the optimization analysis unit 25 described later.

For example, when topology optimization is applied to optimization analysis by the optimization analysis unit 25 and a density method is used in topology optimization, topology optimization is executed by setting the element densities of elements (two-dimensional element and/or three-dimensional element) that model a part or member of the automotive body as design variables and setting minimization of the total sum of strain energies of the automotive body 41 being an objective function as an objective condition without setting the design space, to thereby acquire the element densities. The element densities acquired in this manner serve as an indicator representing the sensitivity to the stiffness of the automotive body 41.

Figure 6:
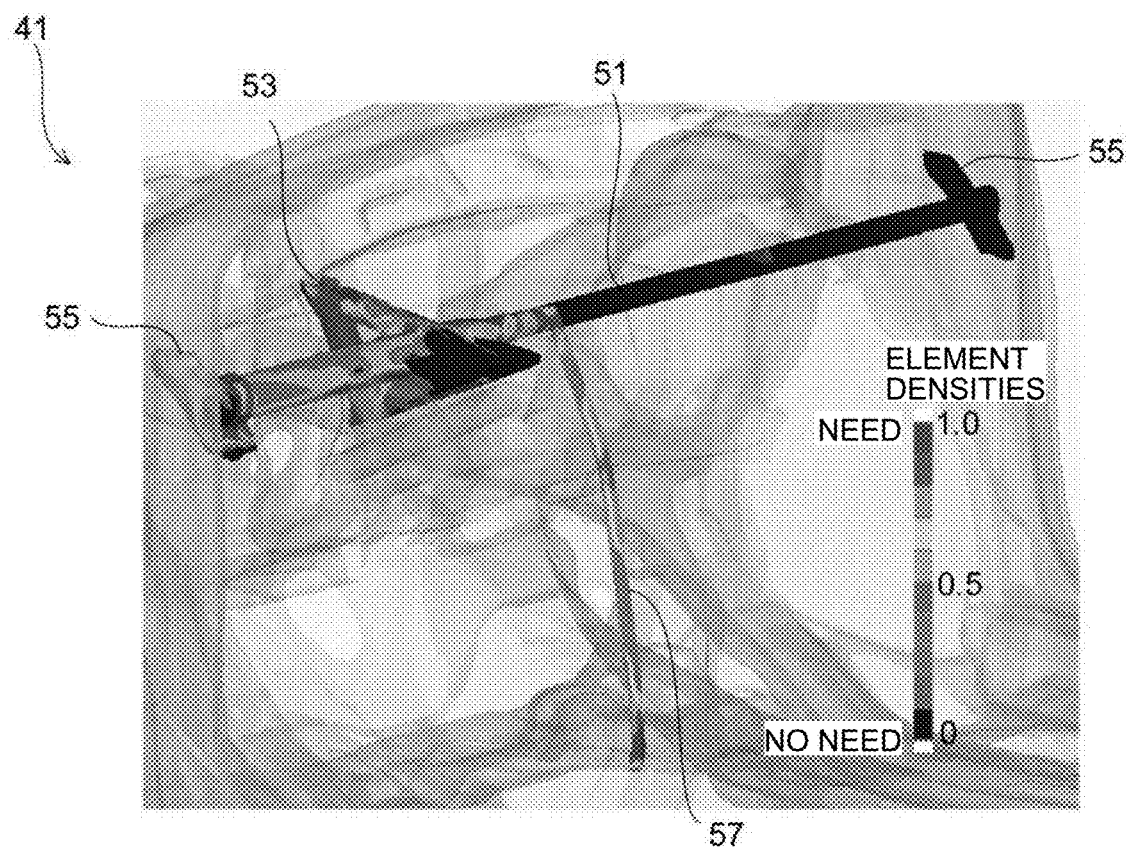
FIG. 6 is a distribution map of element densities showing sensitivity of a part acquired by sensitivity analysis in the present embodiment.

FIG. 6 illustrates an example of a result of performing sensitivity analysis for the steering beam 51, the bracket 53, the connection sections 55, and the stay section 57, which are parts or members on the path that transmits vibration of the steering wheel 49. FIG. 6 represents a value of element densities showing sensitivity to stiffness in sensitivity analysis in a distribution map, and this means the fact that as the value of element densities becomes closer to 1.0, the sensitivity to performance becomes larger, whereas as the value of element densities becomes closer to 0, the sensitivity to performance becomes smaller. With this, it is possible to identify the bracket 53 as an optimization target because the sensitivity of the bracket 53 is higher than those of other parts or members.

Design Space Setting Unit

Figure 7:
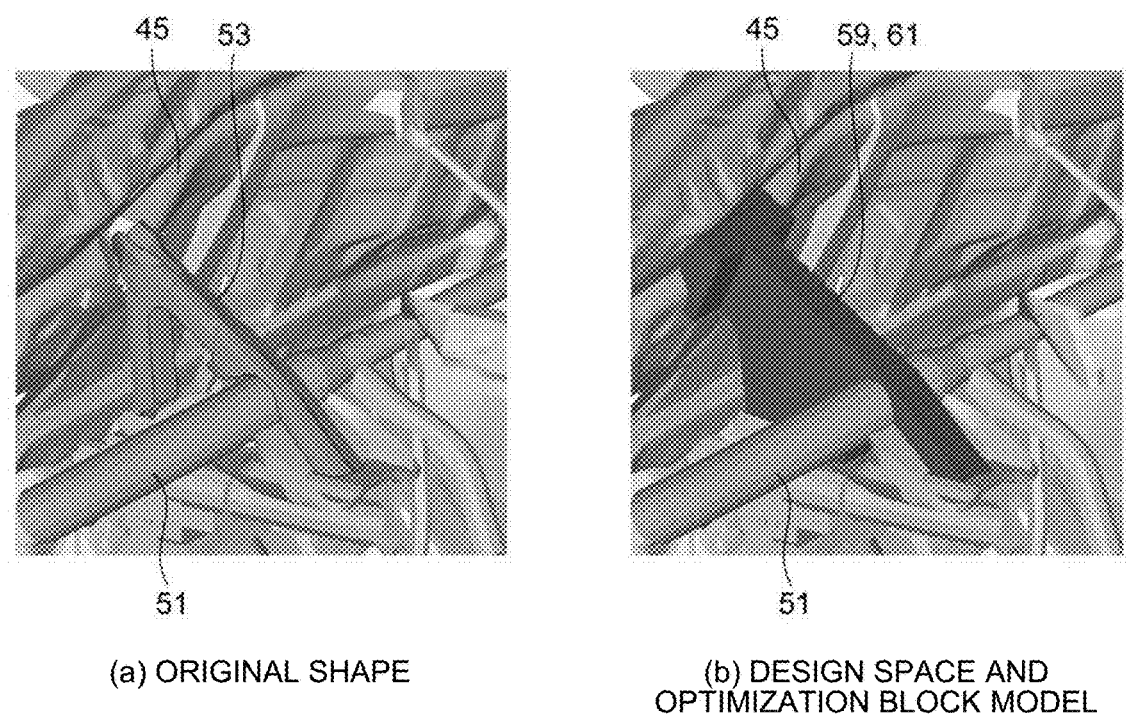
FIGS. 7(a) and 7(b) are diagrams illustrating examples of an original shape of a bracket being an optimization target and a design space that is set for the bracket in the present embodiment.

The design space setting unit 19 sets a design space with the part or member identified by the sensitivity analysis unit 17 serving as an optimization target. FIG. 7 illustrate examples of setting a design space 59 for the bracket 53 identified by the sensitivity analysis unit 17 as an optimization target. The design space 59 can be set in any manner based on the original shape of the bracket 53 and space between the bracket 53 and other parts around the bracket 53.

The design space setting unit 19 is not limited to have such a configuration as to set the design space by setting the part or member identified by the sensitivity analysis unit 17 as an optimization target, and may identify any part or member as an optimization target to set the design space.

Figure 8:
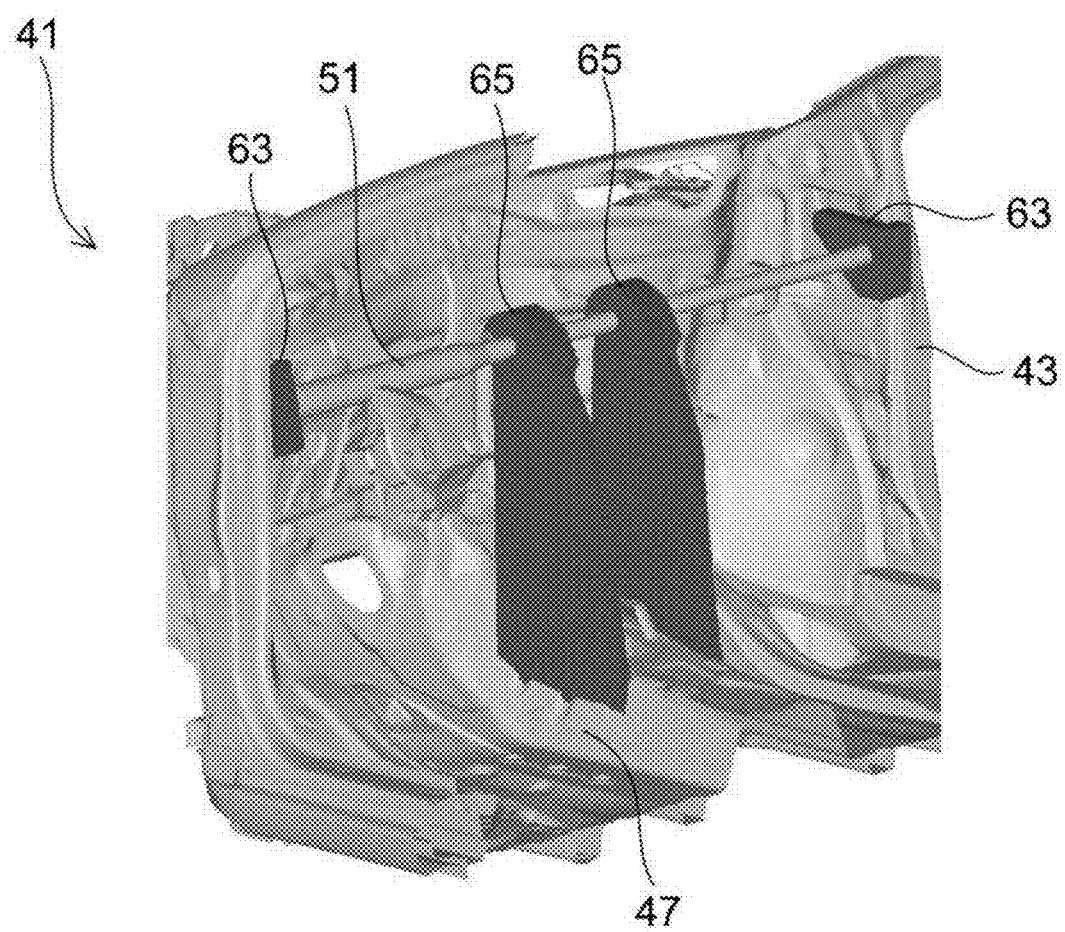
FIG. 8 is a diagram illustrating an example in a case where the design spaces are set for stay sections and connection sections being an optimization target in the present embodiment.

Furthermore, the design space setting unit 19 is not limited to have such a configuration as to set the design space for only one part or member. For example, as illustrated in FIG. 8, design spaces 63 may be set for the connection sections 55 and design spaces 65 may be set for the stay section 57 (refer to FIG. 2).

Optimization Block Model Generating Unit

The optimization block model generating unit 21 generates an optimization block model formed of three-dimensional elements in the design space set by the design space setting unit 19. FIG. 7(b) illustrates an example of generating an optimization block model 61 formed of three-dimensional elements in the design space 59 set for the bracket 53.

The optimization block model generated by the optimization block model generating unit 21 is subjected to optimization analysis by the optimization analysis unit 25 described later, and in the process of optimization analysis, three-dimensional elements positioned at a portion that contributes less to improvement of stiffness are removed, and three-dimensional elements positioned at a portion that contributes more to improvement of stiffness remain.

The optimization block model generated by the optimization block model generating unit 21 is preferred to be modeled by three-dimensional elements, which are a pentahedron, a hexahedron, a heptahedron, or an octahedron, and have at least one combination of two parallel surfaces. Furthermore, the optimization block model generating unit 21 is preferred to generate the optimization block model so that a surface parallel to surfaces around the design space 59 in the automotive body 41 has the maximum area.

Furthermore, the optimization block model generating unit 21 may generate the optimization block model by arranging nodes at a portion connecting to two-dimensional elements and/or three-dimensional elements forming the automotive body, and stacking three-dimensional elements being a hexahedron along the surface parallel to surfaces around the design space 59.

Combining Processing Unit

The combining processing unit 23 combines the optimization block model generated by the optimization block model generating unit 21 to the automotive body, and generates an optimization analysis model. The optimization block model and the automotive body may be combined by using rigid body elements or by sharing nodes.

Optimization Analysis Unit

The optimization analysis unit 25 gives, as a load condition, the load acquired by the maximum displacement and load acquisition unit 15 to the optimization analysis model generated by the combining processing unit 23, performs optimization analysis by using the optimization block model as an optimization target in consideration of an inertial force that occurs at a part of the automotive body due to excitation, and acquires an optimal shape of the optimization block model.

Furthermore, the optimization analysis unit 25 gives an objective condition, which is set in accordance with an object of optimization analysis, and limiting conditions to be imposed for optimization analysis, as optimization analysis conditions in optimization analysis. The objective condition is, for example, minimization of the total sum of strain energies, minimization of the displacement, minimization of the volume, or minimization of the mass in the optimization analysis model. On the other hand, the limiting conditions are, for example, a volume limiting fraction of the optimization block model being an optimization analysis target, or a displacement amount or stress of any node. A plurality of the limiting conditions can be set.

Furthermore, the optimization analysis unit 25 uses the inertia relief method to consider an inertial force that occurs at a part of the automotive body due to excitation. The inertia relief method herein refers to an analysis technique of acquiring stress or strain based on a force acting on an object in uniformly accelerated motion under a free support state in which the object is supported at a supporting point serving as a criterion of coordinates of the inertial force. This method is used for static analysis of an airplane or ship in motion.

In the present embodiment, it is possible to consider an inertial force at the time of excitation of the steering wheel 49 by applying a load that causes the same displacement as the maximum displacement of vibration of the steering wheel 49 due to the excitation, and applying the inertia relief method in optimization analysis.

Topology optimization can be applied as optimization analysis by the optimization analysis unit 25, for example. When there are a large number of intermediate densities at the time of using a density method in topology optimization, it is preferred to give a penalty coefficient as the optimization parameter as shown in Expression (1) given below and perform discretization.

$$K'(\rho) = \rho^p K \tag{1}$$

Where

K': stiffness matrix obtained by imposing penalty on stiffness matrix of elements K: stiffness matrix of elements $\rho$: normalized density p: penalty coefficient There are two or more penalty coefficients that are often used for discretization, and the values of penalty coefficients can be set appropriately.

FIG. 9(a) illustrates an example of an optimal shape 67 of the optimization block model of the bracket 53 for which topology optimization is applied to the optimization analysis unit 25 in the present embodiment.

The optimal shape 67 of the optimization block model is an optimization block model that remains in topology optimization, in which the load acquired by the maximum displacement and load acquisition unit 15 is given to the steering wheel 49 as the load condition, and minimization of the total sum of strain energies, which serves as an objective condition, and the volume limiting fraction being 20% or less, which serves as a limiting condition, are given as the optimization analysis condition. One end of the optimal shape 67 is connected to the dashboard 45, and the other end of the optimal shape 67 is in contact with and connected to half or more of the circumference surface on the front side of the automotive body of the steering beam 51.

Figure 9:
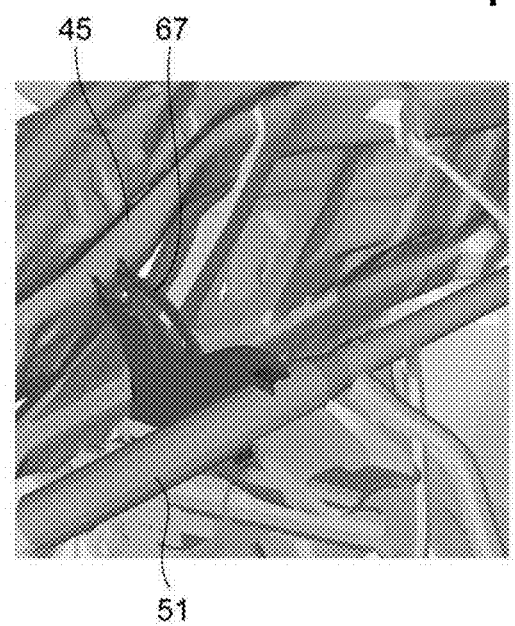
FIGS. 9(a) and 9(b) are diagrams illustrating examples of an optimal shape of an optimization block model acquired by optimization analysis and an optimization shape part set based on the optimal shape of the bracket in the present embodiment.
Figure 9:
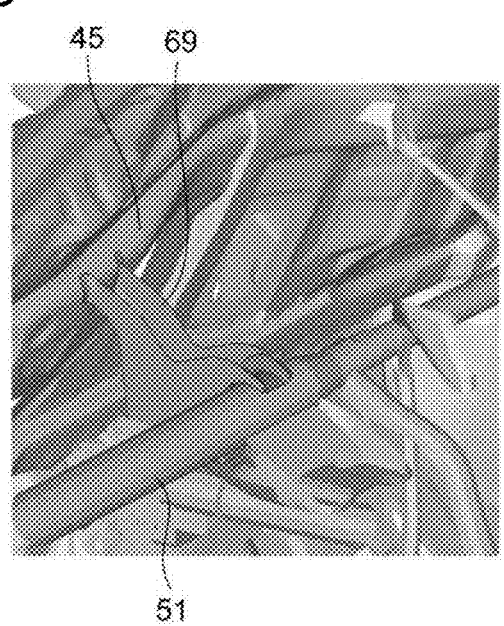

In this manner, as illustrated in FIG. 9(*a*), the optimal shape 67 of the optimization block model is acquired by securing and deleting three-dimensional elements so as to satisfy the above-mentioned analysis condition (load condition, objective condition, and limiting condition).

Furthermore, FIG. 9(*b*) illustrates an optimization shape part 69, which imitates the optimal shape 67 of the optimization block model, and similarly to the optimal shape 67, the optimization shape part 69 is set to have such a shape that one end of the optimization shape part 69 is connected to the dashboard 45, and the other end of the optimization shape part 69 is in contact with and connected to half or more of the circumference surface on the front side of the automotive body of the steering beam 51.

As described above, the optimization analysis unit 25 may perform topology optimization, or may perform optimization analysis by other calculation methods. Furthermore, for example, commercially available analysis software using a finite element method can be used as the optimization analysis unit 25.

Analysis Method for Optimizing Vibration Performance of Automotive Body

Next, in the following, description is given of the analysis method (hereinafter simply referred to as "vibration performance optimization analysis method") for optimizing vibration performance of an automotive body according to the present embodiment.

Figure 10:
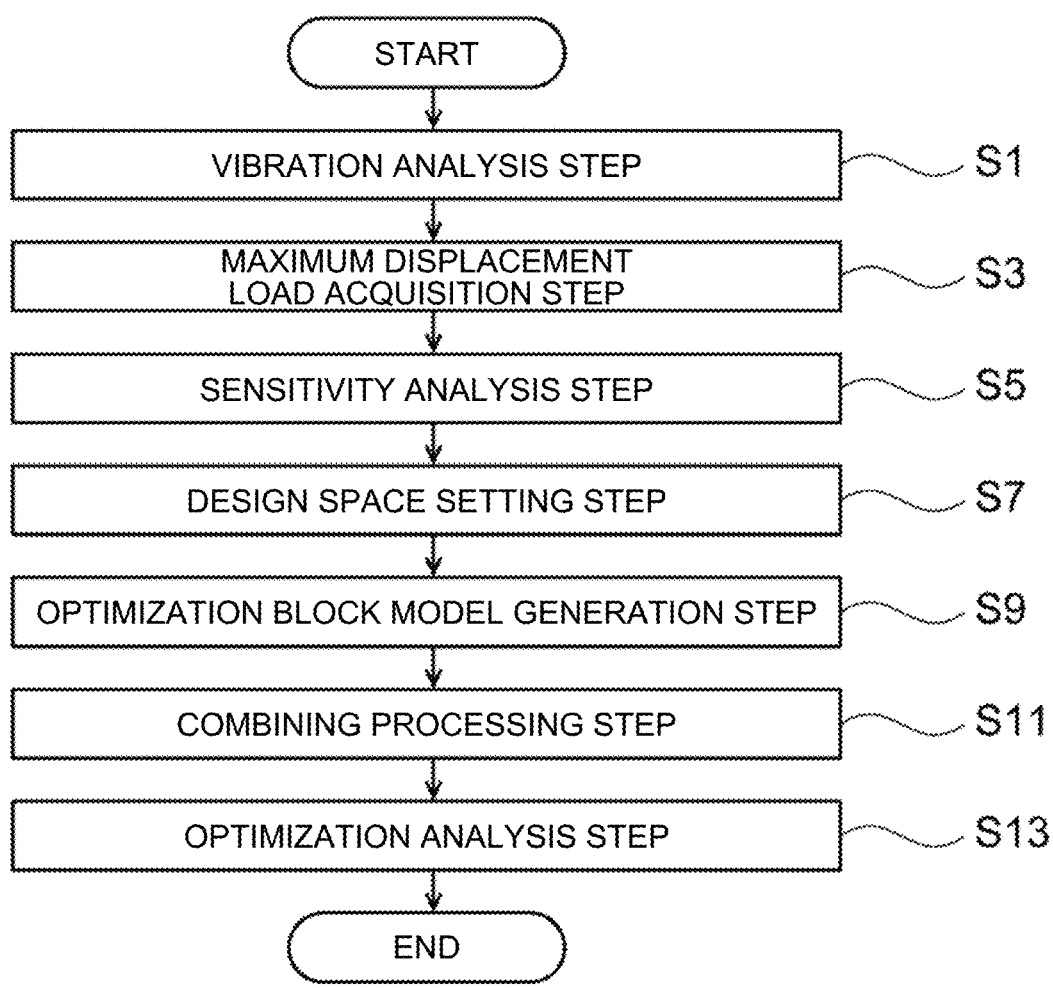
FIG. 10 is a flow chart for illustrating an analysis method for optimizing vibration performance of an automotive body according to an embodiment of the present invention.

The vibration performance optimization analysis method according to the present embodiment optimizes vibration performance of a part of the automotive body, and as illustrated in FIG. 10, includes a vibration analysis step S1, a maximum displacement load acquisition step S3, a sensitivity analysis step S5, a design space setting step S7, an optimization block model generation step S9, a combining processing step S11, and an optimization analysis step S13. In the following, description is given of each step described above. The vibration performance optimization analysis method according to the present embodiment is executed by using the vibration performance optimization analysis apparatus 1 (refer to FIG. 1) constructed by a computer to execute each step described above.

Vibration Analysis Step

The vibration analysis step S1 is a step of performing vibration analysis by applying a predetermined excitation condition to a part of the automotive body, and acquiring the maximum displacement of the part of the automotive body. In the present embodiment, the vibration analysis unit 13 of the vibration performance optimization analysis apparatus 1 performs vibration analysis by applying a predetermined excitation condition to the steering wheel 49 (refer to FIG. 2) being a part of the automotive body 41, and acquires the maximum displacement of the steering wheel 49.

Maximum Displacement Load Acquisition Step

The maximum displacement load acquisition step S3 is a step of acquiring a load required for applying, to a part of the automotive body, the same displacement as the maximum displacement acquired in the vibration analysis step S1. In the present embodiment, the maximum displacement and load acquisition unit 15 of the vibration performance optimization analysis apparatus 1 acquires a load required for applying the same displacement as the maximum displacement of the steering wheel 49 acquired in the vibration analysis step S1.

Sensitivity Analysis Step

The sensitivity analysis step S5 is a step of performing sensitivity analysis of the automotive body by applying the load acquired in the maximum displacement load acquisition step S3 as a load condition, and identifying a part or member being an optimization target. In the present embodiment, the sensitivity analysis unit 17 of the vibration performance optimization analysis apparatus 1 performs sensitivity analysis of the automotive body 41 by applying the load acquired by the maximum displacement and load acquisition unit 15 as a load condition, and identifies the bracket 53 being a part having a high sensitivity as an optimization target as illustrated in FIG. 6.

Design Space Setting Step

The design space setting step S7 is a step of setting a design space for the part or member identified as an optimization target in the sensitivity analysis step S5. In the present embodiment, as illustrated in FIGS. 7, the design space setting unit 19 of the vibration performance optimization analysis apparatus 1 sets the design space 59 with the bracket 53 identified in the sensitivity analysis step S5 serving as an optimization target.

Optimization Block Model Generation Step

The optimization block model generation step S9 is a step of generating an optimization block model formed of three-dimensional elements in the design space set in the design space setting step S7. In the present embodiment, as illustrated in FIG. 7(*b*), the optimization block model generating unit 21 of the vibration performance optimization analysis apparatus 1 generates the optimization block model 61 in the design space 59 set for the bracket 53.

Combining Processing Step

The combining processing step S11 is a step of combining the optimization block model generated in the optimization block model generation step S9 to the automotive body, and generating an optimization analysis model. In the present embodiment, the combining processing unit 23 of the vibration performance optimization analysis apparatus 1 combines the optimization block model 61 generated in the optimization block model generation step S9 to the automotive body 41, and generates an optimization analysis model (not shown).

Optimization Analysis Step

The optimization analysis step S13 is a step of applying, as a load condition, the load acquired in the maximum displacement load acquisition step S3, performing optimization analysis for the optimization block model in consideration of an inertial force that occurs at a part of the automotive body due to excitation, and acquiring an optimal shape of the optimization block model. In the present embodiment, the optimization analysis unit 25 of the vibration performance optimization analysis apparatus 1 gives, as a load condition, the load acquired in the maximum displacement load acquisition step S3, performs optimization analysis for the optimization block model 61 of the bracket 53 in consideration of an inertial force that occurs at the steering wheel 49 due to excitation, and acquires the optimal shape 67 (FIG. 9(*a*)) of the optimization block model.

Furthermore, in the optimization analysis step S13, an objective condition, which is set in accordance with an object of optimization analysis, and limiting conditions to be imposed for optimization analysis, are given as optimization analysis conditions in optimization analysis.

Furthermore, in the optimization analysis step S13, it is possible to consider an inertial force at the time of excitation of the steering wheel 49 by applying a load that causes the same displacement as the maximum displacement of vibration of the steering wheel 49 due to the excitation, and applying the inertia relief method in optimization analysis.

Topology optimization can be applied as optimization analysis in the optimization analysis step S13, for example. When the density method is applied in topology optimization, it is preferred to set two or more penalty coefficients given as the optimization parameter and perform discretization.

Optimization analysis processing by other calculation methods can be applied as optimization analysis in the optimization analysis step S13, and for example, commercially available analysis software using a finite element method can also be used for the optimization analysis processing.

As described above, with the analysis method and apparatus for optimizing vibration performance of an automotive body according to the present embodiment, it is possible to optimize vibration performance of a part of the automotive body and achieve both of improvement of dynamic stiffness of the part of the automotive body and weight reduction of the part of the automotive body by acquiring the optimal shape of a part or member on a path that transmits vibration of a vibrating part.

The analysis method and apparatus for optimizing vibration performance of an automotive body according to the present embodiment performs sensitivity analysis of the automotive body, and identifies the bracket as a part being an optimization target. However, in the present invention, optimization analysis may be performed by setting an appropriately selected part as an optimization target without performing sensitivity analysis.

Furthermore, in the present invention, it is preferred to set a specific gravity of the optimization block model so that the mass of the optimization block model generated by the optimization block model generating unit 21 or in the optimization block model generation step S9 is equal to the mass of the part or member being an optimization target. With this, it is possible to accurately consider the influence of an inertial force due to excitation of a vibrating part in optimization analysis that sets the optimization block model as an analysis target.

Furthermore, in the above description of the present invention, the steering wheel is set as a part that vibrates in response to vibration of the automotive body, and the bracket is set as a part that transmits vibration of the steering wheel. However, the present invention is not limited thereto, and the present invention can be applied without particular limitation as long as a part for which vibration performance is to be optimized and a part or member on a path that transmits vibration of the part are used.

EXAMPLES

In the following, description is given of an experiment of verifying an effect of the analysis method and apparatus for optimizing vibration performance of an automotive body according to the present invention.

In the present example, the automotive body 41, the steering wheel 49 being a part of the automotive body 41 to be excited, the steering beam 51 supporting the steering wheel 49, the bracket 53, the connection sections 55, and the stay section 57 as illustrated in FIG. 2 are set as analysis targets to perform vibration analysis, sensitivity analysis, and optimization analysis of the shape.

First, a predetermined excitation condition was given to the steering wheel 49 to perform vibration analysis. In the present example, as illustrated in FIG. 2, vibration (Y excitation) in the width direction and vibration (Z excitation) in the vertical direction on the steering surface of the steering wheel 49 were given as excitation conditions.

Figure 11:
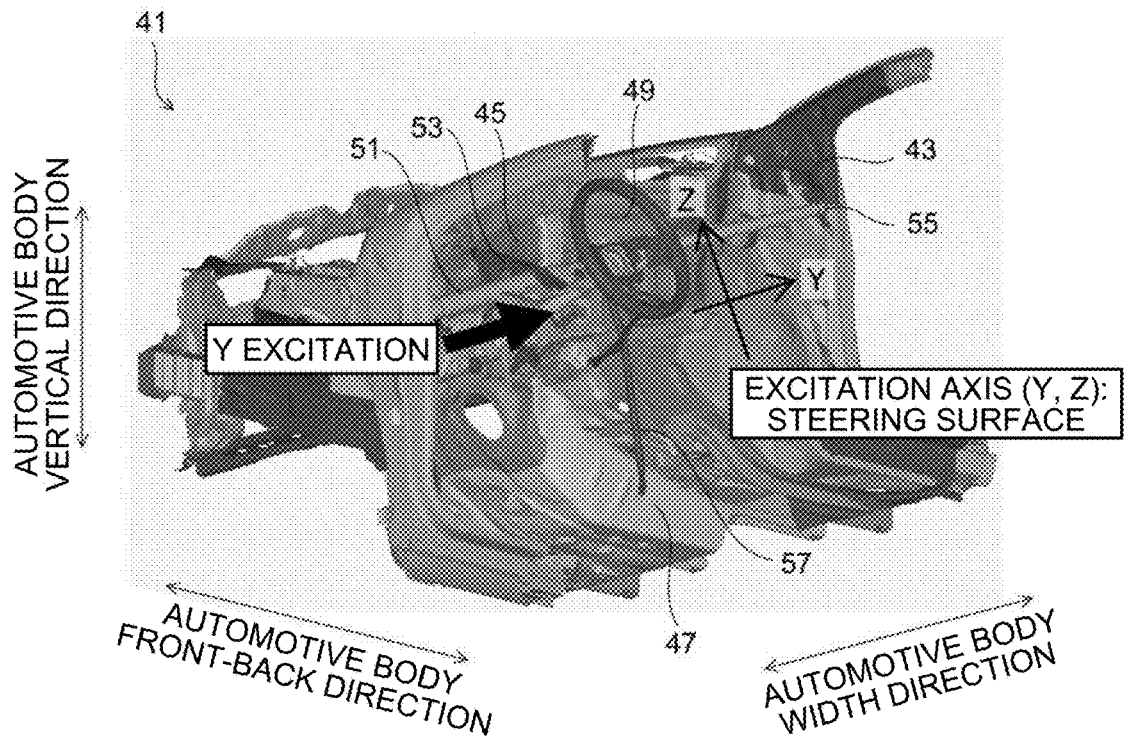
FIG. 11 is a result illustrating a maximum displacement of the steering wheel acquired by frequency response analysis in an example of the present invention (Y excitation).
Figure 12:
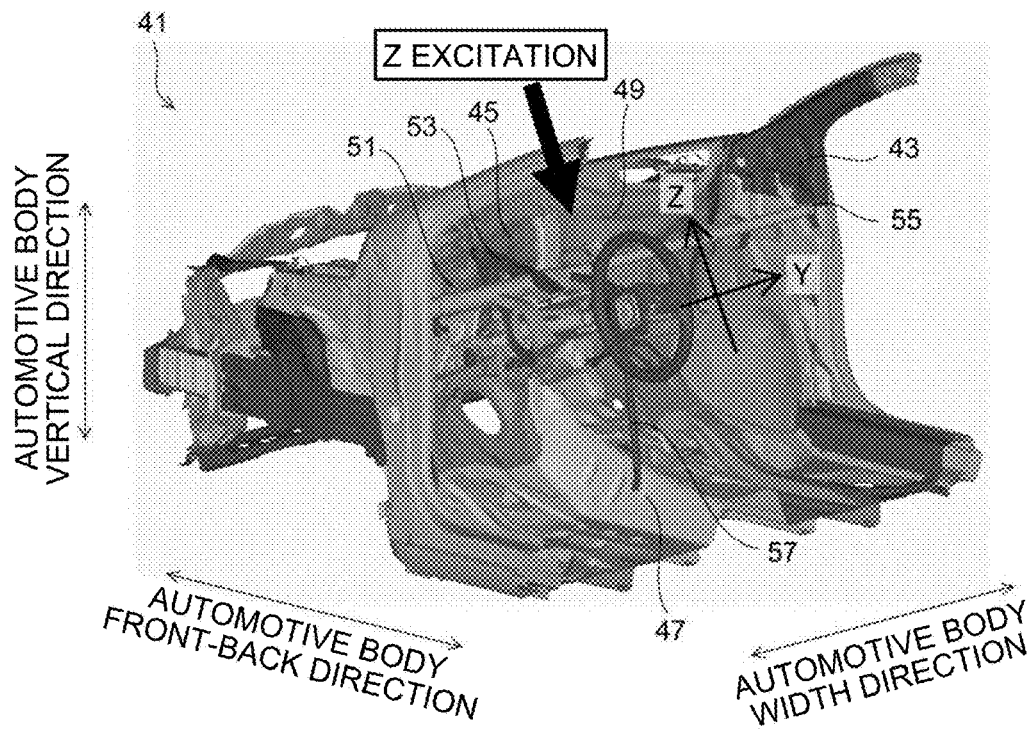
FIG. 12 is a result illustrating a maximum displacement of the steering wheel acquired by frequency response analysis in an example of the present invention (Z excitation).

Frequency response analysis was used as vibration analysis to acquire the frequency response of vibration for each of Y excitation and Z excitation. Then, the maximum displacement was acquired for each of Y excitation and Z excitation of the steering wheel 49 based on the acquired frequency response. FIG. 11 and FIG. 12 illustrate the maximum displacements of the steering wheel 49 for Y excitation and Z excitation, respectively.

Then, loads that cause the same displacement as the maximum displacement of the steering wheel 49 as illustrated in FIG. 11 and FIG. 12 were acquired for Y excitation and Z excitation, respectively (refer to FIG. 5).

Figure 13:
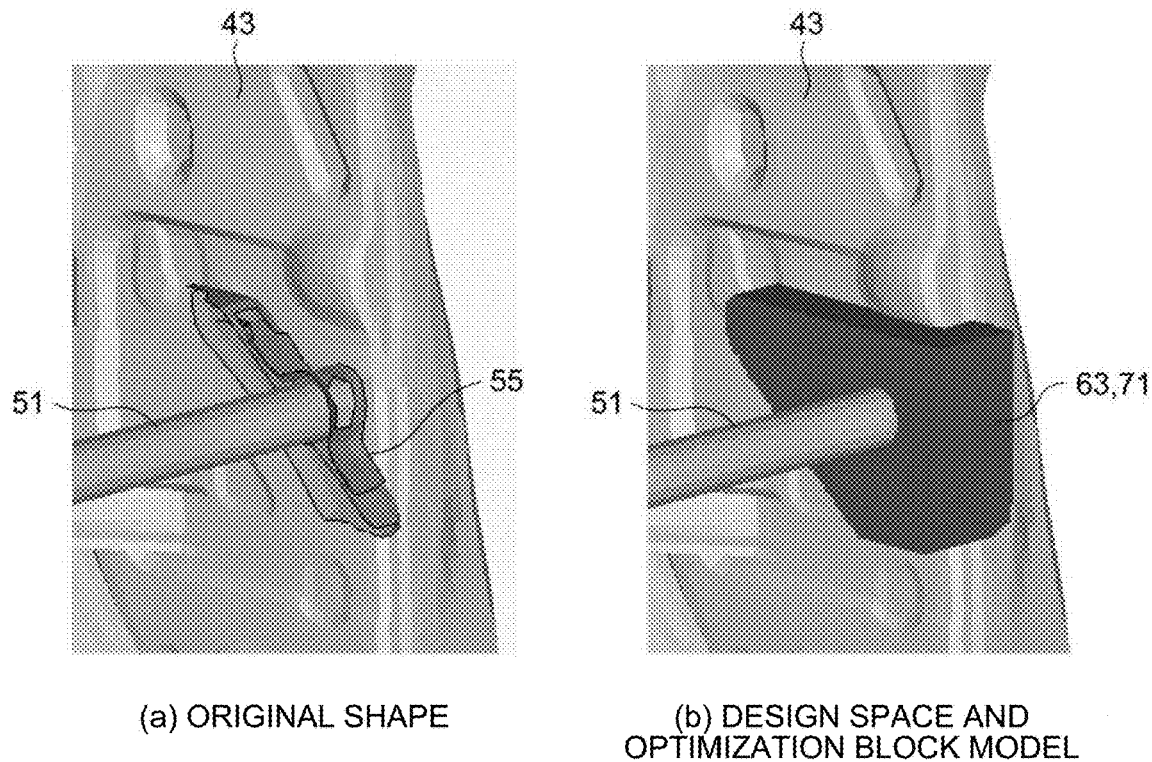
FIGS. 13(a) and 13(b) are diagrams illustrating a connection section being an optimization analysis target and a design space that is set for the connection section in an example of the present invention.

Next, as illustrated in FIG. 7(a), the design space 59 was set for the bracket 53, and further, as illustrated in FIGS. 13, the design space 63 was set for the one connection section 55. FIG. 13(a) illustrates the original shape of the connection section 55, and FIG. 13(b) illustrates the design space 63 set for the connection section 55.

The original shapes of the bracket 53 and the connection section 55 imitated shapes generally used for attachment to the automotive body 41 of the steering beam 51. The original shape of the bracket 53 is a shape that supports the steering beam 51 by suspending the steering beam 51 from the above, and the original shape of the connection section 55 is a shape that sandwiches the end portion of the steering beam 51 in two directions around the axis.

Furthermore, in the present example, the bracket 53 and the connection section 55 were set as optimization analysis targets.

Next, the optimization block model 61 (FIG. 7(b)) and an optimization block model 71 (FIG. 13(b)) were generated for the set design space 59 and design space 63, respectively. Then, the generated optimization block model 61 and optimization block model 71 were each combined to the automotive body 41 to generate an optimization analysis model (not shown).

Next, a load condition and an optimization analysis condition were given to the generated optimization analysis model to perform optimization analysis. As the load condition, as illustrated in FIG. 5(b), loads (Y load and Z load) were given in the Y direction and Z direction of the steering wheel 49, respectively. As the optimization analysis condition, minimization of the total sum of strain energies was given an objective condition, and the volume limiting fraction being 20% or less was given as a limiting condition.

Then, optimization analysis was performed by topology optimization for the optimization analysis model in which the above-mentioned load condition and the optimization analysis condition were given, to thereby acquire the optimization block model. FIG. 9 illustrate the optimal shape 67 of the optimization block model acquired for the bracket 53, and FIG. 14(a) illustrates an optimal shape 73 of the optimization block model acquired for the connection section 55.

Furthermore, in the present example, the optimization shape part 69 illustrated in FIG. 9(b) and an optimization shape part 75 illustrated in FIG. 14(b) were determined for the optimal shape 67 (FIG. 9(a)) and the optimal shape 73 (FIG. 14(a)) of the optimization block model, respectively, and vibration performance of the automotive body 41 to which the determined optimization shape part 69 and optimization shape part 75 were applied was evaluated.

The optimization shape part 75 for the connection section 55 imitated the optimal shape 73 of the optimization block model, and similarly to the optimal shape 73, and the optimization shape part 75 was set so that the one end portion of the steering beam 51 was connected to the one A pillar 43 in a fixed manner so as to be supported in three directions around the axis.

Then, frequency response analysis at a time when a predetermined excitation condition was given to the steering wheel 49 of the automotive body 41 was performed to evaluate vibration performance by a frequency for which the acceleration has a peak in frequency response acquired by the frequency response analysis.

Furthermore, the excitation condition in frequency response analysis was set as the same condition as that of frequency response analysis of acquiring the maximum displacement, and was given to the steering wheel 49 in each of the Y direction and the Z direction.

The excitation condition was set as a condition generally applied in evaluation of vibration performance of the steering wheel 49, and a frequency to be given to the steering wheel 49 being an excitation point and a load amplitude in that frequency were set in frequency response analysis.

Figure 14:
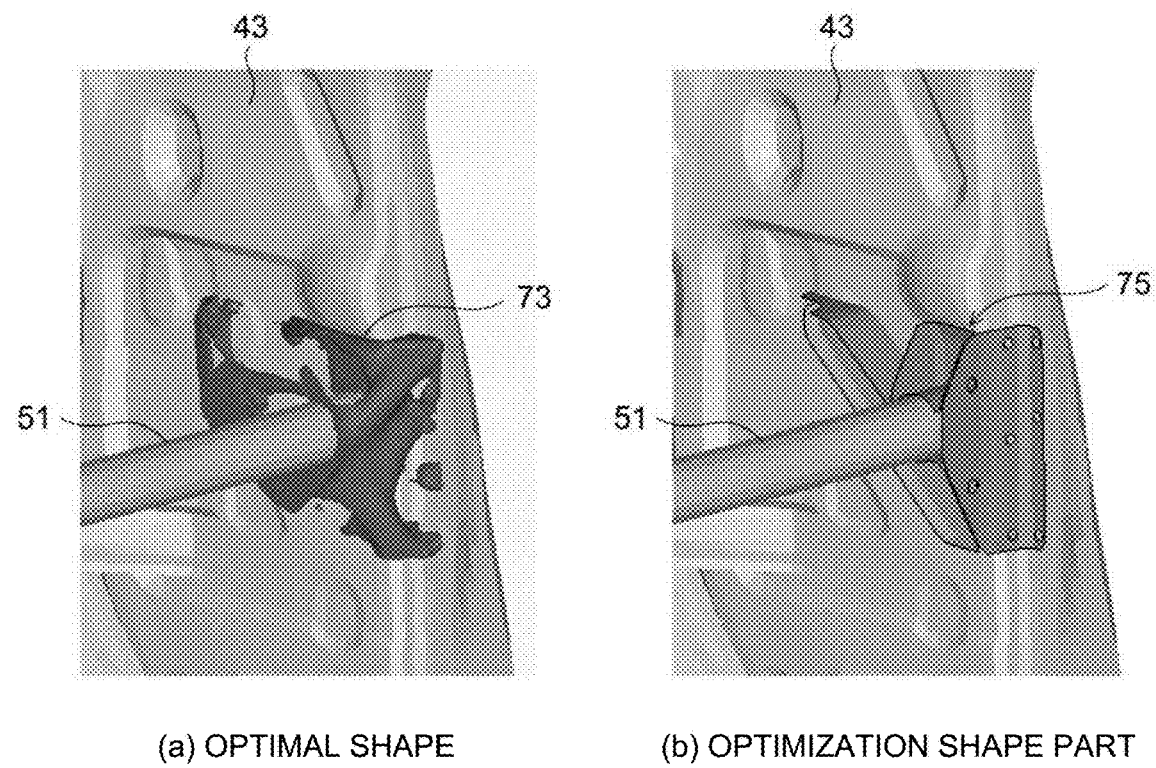
FIGS. 14(a) and 14(b) are diagrams illustrating an optimal shape of an optimization block model acquired by setting a connection section as an optimization target and an optimization shape part set based on the optimal shape of the connection section in an example of the present invention.

In the present example, as examples of the invention, an invention that uses the optimization shape part 69 (FIG. 9(*b*)) of the bracket 53 was set as a first example of the invention, and an invention that uses the optimization shape part 69 of the bracket 53 and the optimization shape part 75 (FIG. 14(*b*)) of the connection section 55 in the width direction was set as a second example of the invention. Furthermore, an invention that uses the bracket 53 and the connection section 55 having original shapes was set as a reference example.

Figure 15:
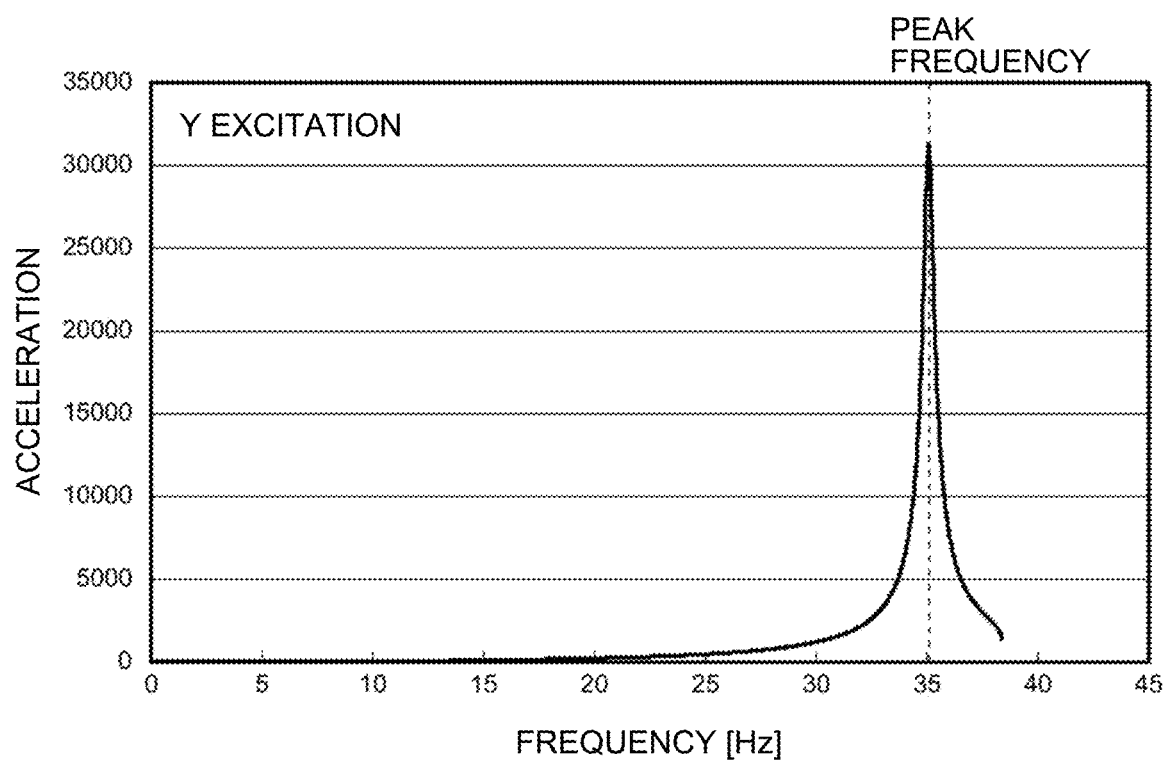
FIG. 15 is a graph showing a result of analyzing frequency response acquired in frequency response analysis of the steering wheel in an example of the present invention (Y excitation).
Figure 16:
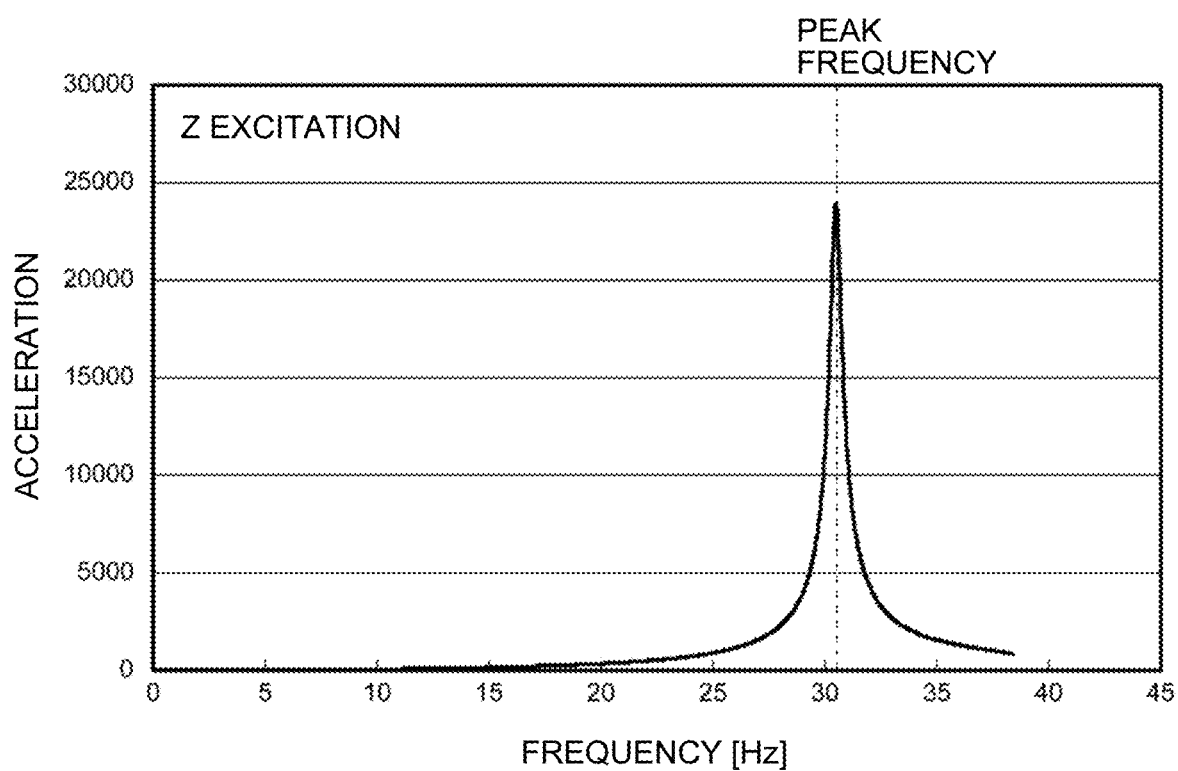
FIG. 16 is a graph showing a result of analyzing frequency response acquired in frequency response analysis of the steering wheel in an example of the present invention (Z excitation).

Results of frequency response analysis in the second example of the invention are shown in FIG. 15 and FIG. 16, respectively. FIG. 15 represents frequency response (horizontal axis: frequency; vertical axis: acceleration) in a case where Y excitation was given as the excitation condition, and the acceleration exhibited a peak value at the frequency of 35.1 Hz. Furthermore, FIG. 16 represents frequency response (horizontal axis: frequency; vertical axis: acceleration) in a case where Z excitation was given as the excitation condition, and the acceleration exhibited a peak value at the frequency of 30.5 Hz.

Figure 17:
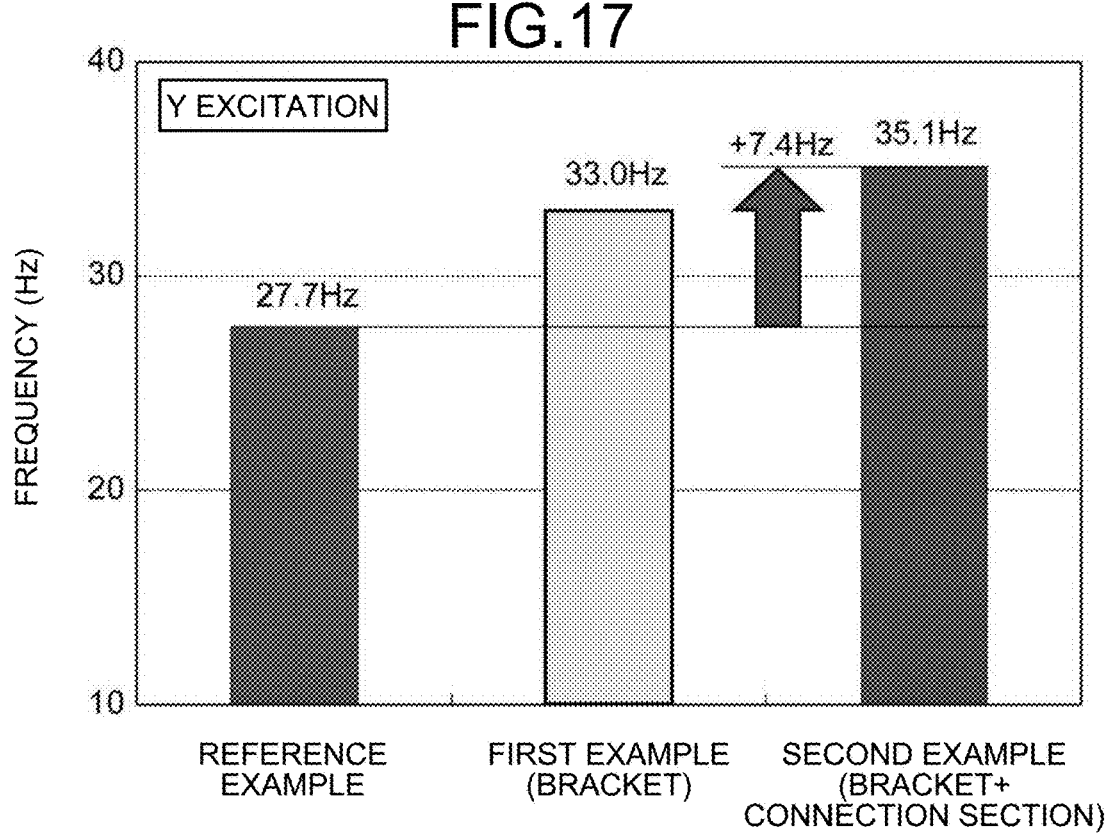
FIG. 17 is a graph showing a peak frequency in frequency response acquired by frequency response analysis in an example of the present invention (Y excitation).
Figure 18:
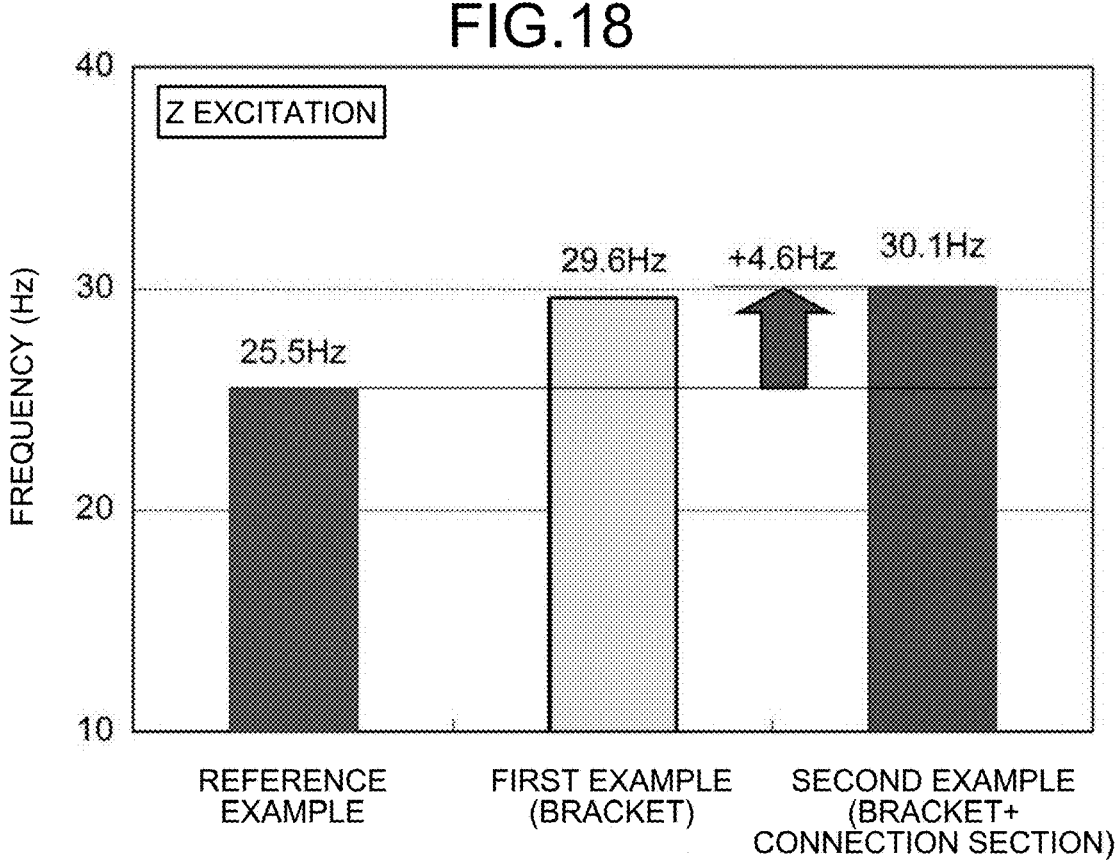
FIG. 18 is a graph showing a peak frequency in frequency response acquired by frequency response analysis in an example of the present invention (Z excitation).

FIG. 17 represents a result of the peak frequency in a case where Y excitation was given as the excitation condition, and FIG. 18 represents a result of the peak frequency in a case where Z excitation was given as the excitation condition.

On the basis of FIG. 17 and FIG. 18, it is understood that, compared with the reference example, the peak frequency of the first example of the invention in which the shape of the bracket 53 was optimized has increased in both the cases of Y excitation and Z excitation. Furthermore, the peak frequency of the second example of the invention in which the shape of the connection section 55 was optimized together with the bracket 53 has increased more compared with the reference example, with the result that the peak frequency has increased by 7.4 Hz in Y excitation and the peak frequency has increased by 4.6 Hz in Z excitation. Furthermore, the weight was reduced by 121 g compared with the original shape in the second example of the invention.

The results of the first example of the invention and the second example of the invention shown in FIG. 17 and FIG. 18 represent the fact that the frequency of the steering was optimized to the frequency of about 30 Hz or more, which is felt by a person (driver), and the dynamic stiffness (firm feeling) has improved.

Next, in order to obtain the effect of improving the dynamic stiffness, a case of increasing the thickness of a steel sheet used for a part or member to be optimized was set as a comparison example, and compared with the examples of the invention for investigation.

Figure 19:
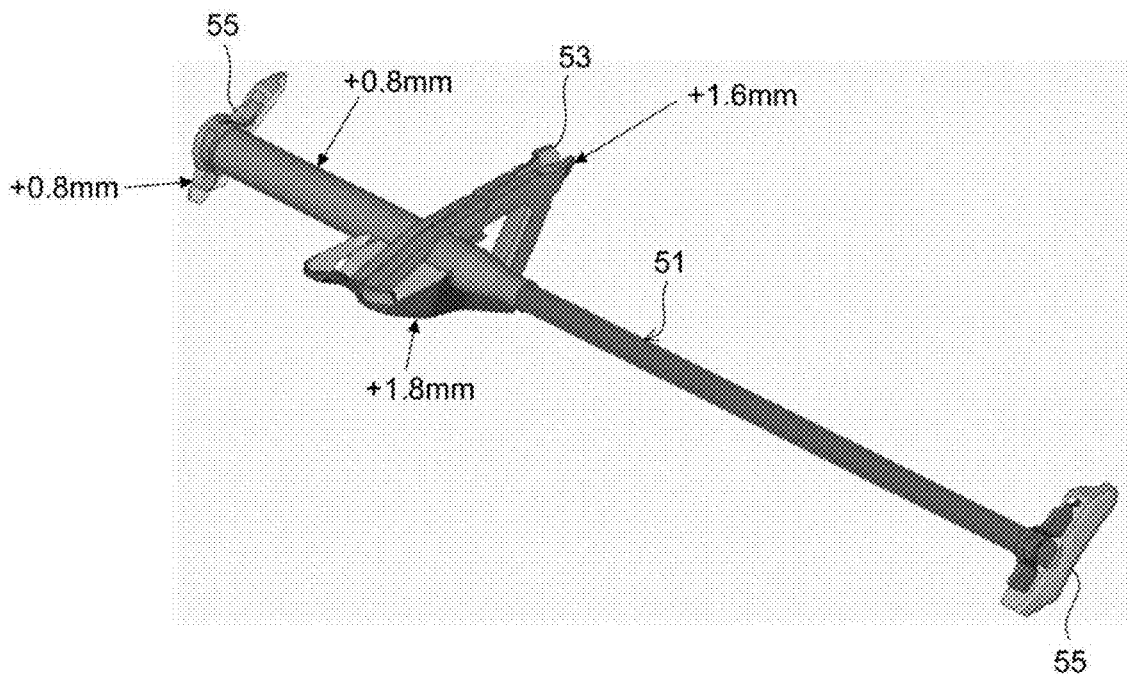
FIG. 19 is a diagram illustrating a part and member with increased thickness and a thickness increase amount for comparison in the present invention.
Figure 20:
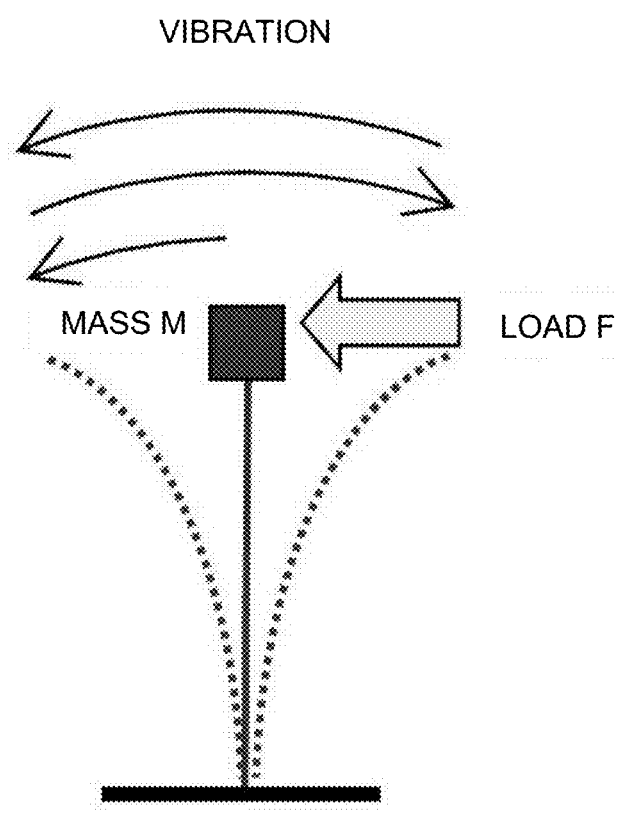
FIG. 20 is a diagram illustrating static stiffness and dynamic stiffness of a structure.

In the comparison example, as illustrated in FIG. 19, the thickness of a part or all of the steering beam 51, the bracket 53, and the connection sections 55 on the path that transmits vibration of the steering wheel 49 was increased by a value illustrated in FIG. 19 compared with that of the original shape of each part or member.

Then, similarly to the examples of the invention, frequency response analysis was performed to acquire a peak frequency at which the acceleration has a peak in frequency response also for the comparison example. As a result, the peak frequency has increased by 5.5 Hz in Y excitation, and the peak frequency has increased by 4.7 Hz in Z excitation in the comparison example, resulting in improvement of the dynamic stiffness by the same degree as that of the examples of the invention. However, in the comparison example, the weight has increased by 3.3 kg due to increase in thickness, which means that the weight efficiency for improving the dynamic stiffness has an extremely negative result compared with the examples of the invention.

On the basis of the description given above, it is shown that the analysis method and apparatus for optimizing vibration performance of an automotive body according to the present invention acquires the optimal shape of a part or member on the path that transmits vibration of a part of the automotive body, to thereby optimize the vibration performance of the part of the automotive body and achieve both of improvement of dynamic stiffness of the part of the automotive body and weight reduction of the part of the automotive body.

INDUSTRIAL APPLICABILITY

According to the present invention, it is possible to provide an analysis method and apparatus for optimizing vibration performance of a part of an automotive body, and achieving both of improvement of dynamic stiffness of the part of the automotive body and weight reduction of the part of the automotive body.

REFERENCE SIGNS LIST

1 vibration performance optimization analysis apparatus
3 display device
5 input device
7 memory storage
9 working data memory
11 arithmetic processing unit
13 vibration analysis unit
15 maximum displacement and load acquisition unit
17 sensitivity analysis unit
19 design space setting unit
21 optimization block model generating unit
23 combining processing unit
25 optimization analysis unit
31 automotive body model file
41 automotive body
43 A pillar
45 dashboard
47 tunnel portion
49 steering wheel
51 steering beam
53 bracket 55 connection section
57 stay section
59 design space (bracket)
61 optimization block model (bracket)
63 design space (connection section)
65 design space (stay section)
67 optimal shape (bracket)
69 optimization shape part (bracket)
71 optimization block model (connection section)
73 optimal shape (connection section)
75 optimization shape part (connection section)

The invention claimed is:

1. An analysis method of optimizing vibration performance of a part of an automotive body, the analysis method being performed by a computer, and comprising:
acquiring a maximum displacement of vibration of the part of the automotive body by:
applying a predetermined excitation condition to the part of the automotive body; and
performing vibration analysis by using frequency response analysis and adding up sine-wave displacements of respective frequencies based on the result of frequency response analysis;
acquiring a load required for applying a same displacement as the acquired maximum displacement, to the part of the automotive body;
setting a design space by setting a part or member that supports the part of the automotive body as an optimization target;
generating an optimization block model formed of three-dimensional elements in the set design space;
generating an optimization analysis model by combining the generated optimization block model to the automotive body; and
acquiring an optimal shape of the optimization block model that achieves weight reduction of the automotive body while at the same time improving dynamic stiffness of the part of the automotive body by using topology optimization in computer aided engineering (CAE) analysis for design of the automotive body by:
applying the acquired load as a load condition; and
performing topology optimization analysis for the optimization block model taking an inertial force that occurs in the part of the automotive body due to vibration into consideration by using inertia relief method.

2. The analysis method according to claim 1, further comprising setting a specific gravity of the optimization block model such that a mass of the optimization block model is equal to a mass of the part or member being the optimization target.

3. The analysis method according to claim 2, further comprising:
identifying the part or member being the optimization target by applying the acquired load as a load condition, and performing sensitivity analysis of the automotive body; and
setting the design space for the identified part or member.

4. The analysis method according to claim 1, further comprising:
identifying the part or member being the optimization target by applying the acquired load as a load condition, and performing sensitivity analysis of the automotive body; and
setting the design space for the identified part or member.

5. An analysis apparatus configured to optimize vibration performance of a part of an automotive body, the analysis apparatus comprising a processor comprising hardware, the processor being configured to:
acquire a maximum displacement of the part of the automotive body by:
applying a predetermined excitation condition to the part of the automotive body; and
performing vibration analysis by using frequency response analysis and adding up sine-wave displacements of respective frequencies based on the result of frequency response analysis;
acquire a load required for applying a same displacement as the acquired maximum displacement, to the part of the automotive body;
set a design space by setting a part or member that supports the part of the automotive body as an optimization target; generate an optimization block model formed of three-dimensional elements in the set design space;
generate an optimization analysis model by combining the generated optimization block model to the automotive body; and
acquire an optimal shape of the optimization block model that achieves weight reduction of the automotive body while at the same time improving dynamic stiffness of the part of the automotive body by using topology optimization in computer aided engineering (CAE) analysis for design of the automotive body by:
applying the acquired load as a load condition; and
performing topology optimization analysis for the optimization block model taking an inertial force that occurs in the part of the automotive body due to vibration into consideration by using inertia relief method.

6. The analysis apparatus according to claim 5, wherein the processor is configured to set a specific gravity of the optimization block model such that a mass of the optimization block model is equal to a mass of the part or member being the optimization target.

7. The analysis apparatus according to claim 6, wherein the processor is configured to:
identify the part or member being the optimization target by:
applying the acquired load as a load condition; and
performing sensitivity analysis of the automotive body; and
set the design space for the identified part or member.

8. The analysis apparatus according to claim 5, wherein the processor is configured to:
identify the part or member being the optimization target by:
applying the acquired load as a load condition; and
performing sensitivity analysis of the automotive body; and
set the design space for the identified part or member.

* * * * *